UNITED STATES PATENT OFFICE.

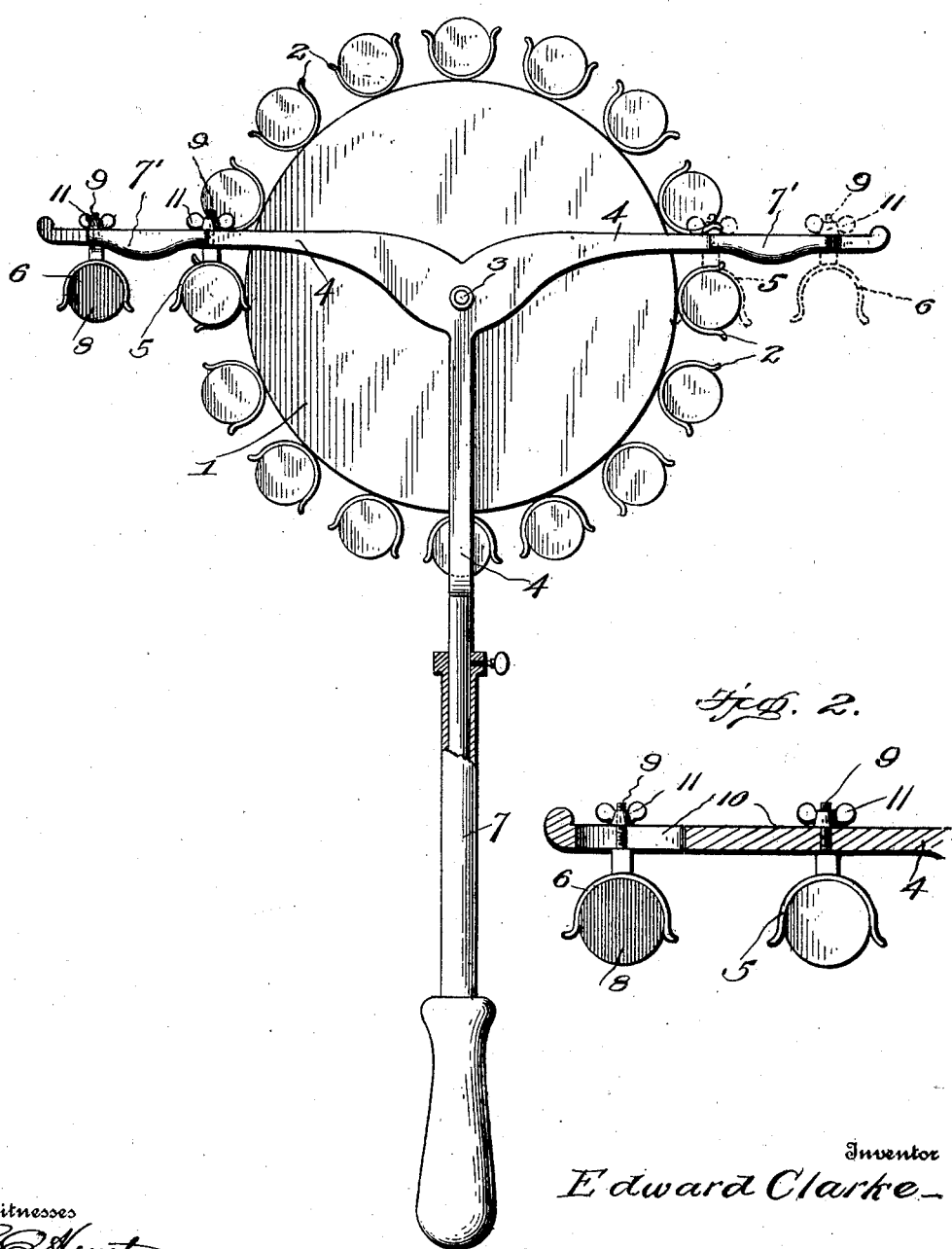

EDWARD CLARKE, OF SAGINAW, MICHIGAN.

OPTOMETER.

SPECIFICATION forming part of Letters Patent No. 711,099, dated October 14, 1902.

Application filed January 6, 1902. Serial No. 88,661. (No model.)

*To all whom it may concern:*

Be it known that I, EDWARD CLARKE, a citizen of the United States, residing at Saginaw, in the county of Saginaw and State of Michigan, have invented certain new and useful Improvements in Optometers; and I do declare the following to be a full, clear, and exact description of the invention, such as will enable others skilled in the art to which it appertains to make and use the same.

The invention relates to optometers.

The object of the invention is to provide an optometer which shall be simple of construction, durable in use, comparatively inexpensive of production, and efficient in action.

With this and other objects in view the invention consists of certain novel features of construction, combination, and arrangement of parts, which will be hereinafter more fully described, and particularly pointed out in the appended claims.

In the accompanying drawings, Figure 1 is a front view of my improved optometer; and Fig. 2 is a sectional view through one of the arms of the frame, showing the manner of adjusting the lens-holder longitudinally the length of said arm.

Referring now more particularly to the drawings, 1 denotes a disk, provided on its periphery with lens holders or clasps 2, which are adapted to contain lenses of different focuses. This disk is pivoted at 3 to the frame 4, which is provided with arms that project laterally in opposite directions beyond the periphery of the disk and are provided with lens holders or clasps 5 and 6. The frame, if it be desired, may be provided with a handle 7 and the arms with head-rests 7'.

In operation, assuming that it be desired to test the right eye, the forehead is placed against the head-rest at the left side of disk 1, and an opaque lens 8 is placed in the lens-holder 6, so as to obstruct the vision of the left eye, and the disk 1 is rotated until the right eye is suited. The number of the lens is then taken and the lens-holders 5 and 6 are changed to the right side, the forehead placed against the head-rest at that side with the opaque disk 8 over the right eye, and the left eye can then be suited. The opaque disk may then be removed from the lens-holder 6 and supplanted with the lens chosen for the right eye and both eyes tried together. The lens-holder 6 is adjustable laterally toward and away from the periphery of the disk to suit different pupilary distances. A simple mode of adjusting the lens-holders is to provide the same with a screw-threaded stem 9, which projects through a longitudinal slot 10, formed in each arm of the frame, and upon this stem is screwed a wing-nut 11 for holding the lens-holder in an adjusted position with respect to the lens-holders on the periphery of the disk. Any other suitable means may, however, be employed, if desired.

The lens-holder 5 is used before the eye under examination to hold any fractional or other lens required in the examination. For example, if the disk 1 is supplied with different plus lenses, a minus lens (equal to the strongest plus lens) placed in the lens holder or clip 5 will give all the corresponding minus powers as the weaker plus lenses in disk 1 are brought before it, and vice versa.

Another feature is that the instrument is not confined to any one combination of lenses, but that the clips allow of the quick removal and replenishing of the lenses and any combination of focus may be set up to suit the operator. The lens chosen may even be taken from the clips and put in spectacle-frames and the clips replenished at leisure.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with a supporting-frame, of a rotary disk pivoted thereto having lens-holders upon its periphery, of lens-holders supported at diametrically opposite points and adjustable toward and away from the periphery of said disk, substantially as set forth.

2. In an optometer, the combination with a supporting-frame, of a disk pivoted centrally thereto and provided with lens-holders, said frame being provided with arms having longitudinal slots located beyond the periphery of the disk, and lens-holders having screw-threaded shanks projecting through said slots and provided with set-nuts, substantially as set forth.

In testimony whereof I have hereunto set my hand in presence of two subscribing witnesses.

EDWARD CLARKE.

Witnesses:
R. G. MONEY,
HARRY FARRELL.